(12) United States Patent  
Oepping et al.

(10) Patent No.: US 6,848,627 B2  
(45) Date of Patent: Feb. 1, 2005

(54) APPARATUS FOR THE APPLICATION OF FORAGE ADDITIVE AND METHOD

(75) Inventors: James M. Oepping, Wilton, IA (US); Joseph R. Lebeda, Des Moines, IA (US); Gabi Oetjen, Selsingen (DE); Ralf Oetjen, Selsingen (DE); Barbara Ruser, Buxtehude (DE); Jakob Kleinmans, Stade (DE); Siegfried Dopp, Geesthachp (DE)

(73) Assignee: Pioneer Hi-Bred International, Inc., Des Moines, IA (US)

( * ) Notice: Subject to any disclaimer, the term of this patent is extended or adjusted under 35 U.S.C. 154(b) by 171 days.

(21) Appl. No.: 10/132,798

(22) Filed: Apr. 25, 2002

(65) Prior Publication Data

US 2003/0201333 A1 Oct. 30, 2003

(51) Int. Cl.⁷ .......................... B05B 17/04; B05B 3/00; B05B 7/12
(52) U.S. Cl. .................. 239/11; 239/722; 239/413; 239/407; 239/67; 239/68
(58) Field of Search ................................. 239/413, 407, 239/722, 67, 68, 69, 70, 71, 1, 11, 569

(56) References Cited

U.S. PATENT DOCUMENTS

| | | | | |
|---|---|---|---|---|
| 4,220,998 A | * | 9/1980 | Kays | 700/283 |
| 4,392,611 A | * | 7/1983 | Bachman et al. | 239/74 |
| 4,542,855 A | * | 9/1985 | Stacey | 239/690 |
| 4,723,709 A | * | 2/1988 | Curran et al. | 239/110 |
| 5,931,882 A | * | 8/1999 | Fick et al. | 701/50 |

* cited by examiner

*Primary Examiner*—Davis Hwu  
(74) *Attorney, Agent, or Firm*—Pioneer Hi-Bred International, Inc.

(57) ABSTRACT

The present invention provides an apparatus and a method for spraying forage additives on harvested agricultural crops and includes a container of concentrated additive, an atomizing spray nozzle, a metering pump for supplying the forage additive to the spray nozzle and an electrical control for actuating the metering to provide a supply of concentrated additive to the spray nozzle as desired. In a preferred embodiment, the forage additive container is of a sufficiently small size that it contains less than three thousand milliliters of the concentrated additive for spraying on the harvested crop.

20 Claims, 5 Drawing Sheets

APPARATUS FOR THE APPLICATION OF FORAGE ADDITIVE AND METHOD

BACKGROUND OF THE INVENTION

1. Field of the Invention

The present invention relates in general to the application of forage additive to harvested agricultural crops for the purpose of preserving the crops in an untainted condition with a majority of its nutrients for later feeding to livestock. More specifically, the invention relates to an apparatus and a method for the application of forage additives in a precisely controlled pattern so that the amount of water utilized with the forage additives is vastly reduced.

2. Description of the Prior Art

It is known in the art that the application of particular types of forage additives to harvested agricultural crops is highly advantageous in preserving the original nutrients in the crops to make them more nutritious for later feeding to livestock. As a result, a variety of devices and methods have previously been utilized for this purpose. For example, when forage is harvested by driving a crop chopper through a field, the harvested forage is often sprayed with forage additives such as inoculants as it is being harvested. A typical forage inoculant includes one or more strains of microorganisms, enzymes, and/or other chemicals. A common problem with inoculants is that if they are mixed with water in large reservoir tanks as is commonly done, all of the inoculant must be used in a specified period of time or its effectiveness can be highly diminished. As a result, often times under such conditions inoculant is wasted or must be discarded.

One prior art system for avoiding this problem is disclosed in U.S. patent application Ser. No. 09/075,110 and incorporates a dual supply system for water and a concentrated inoculant which are mixed together immediately prior to being applied to a harvested crop. The concentrated inoculant is precisely distributed to a water supply line by a peristaltic pump to control the amount of inoculant being supplied and to maintain the inoculant in an effective condition until needed.

The apparatus disclosed in the '110 application has been sold by Pioneer Hi-Bred International since at least 1998. Although such apparatus is highly effective in limiting the amount of inoculant that is wasted or discarded, the apparatus is still dependent upon the incorporation of a relatively large supply of fresh water for mixing with the inoculant during the application process. In view of the fact that fresh water is not readily available in a typical agricultural field, arrangements must be made to provide a temporary supply of fresh water on location or else the harvesting equipment on which the apparatus is utilized must be driven to a source of water. In any event, harvesting time is wasted as a result of the use of a relatively large quantity of water during the application process.

The present invention is adapted to provide a method and an apparatus that can precisely and efficiently apply forage additives to harvested crop without the utilization of a large fresh water source of supply and, therefore, significantly minimizes the amount of water that is utilized during the application process and the harvesting time that would normally be wasted with the use of prior art sprayer apparatus.

SUMMARY OF THE INVENTION

The present invention provides an apparatus and a method for spraying a forage additive on a harvested agricultural crops in a highly concentrated additive spray that is applied directly to the crop in a precise atomized, pattern of micron size droplets. The apparatus preferably includes a container of concentrated forage additive, a fluid metering pump in communication with said additive container and an atomizing spray nozzle located proximate to the harvested crop and supplied with the concentrated additive by said metering pump.

In the preferred embodiment, the apparatus further includes a control means for actuating the metering pump to provide an adjustable supply of concentrated additive directly to the spray nozzle as desired. The control means includes a number of on-and-off switches which control the various operational modes of the present invention and a digital display panel capable of displaying various information including actual application rate and the amount of forage which has been treated.

Thus, it is an object of the present invention to provide an apparatus for spraying agricultural crops with a forage additive in a highly concentrated form so that a large supply of fresh water is not required by the apparatus, which makes it highly adaptable for use on forage equipment. Still further objects and advantages of the present invention will be apparent to those of ordinary skill in the art having reference to the following specification and the drawings which are described below.

DETAILED DESCRIPTION OF THE PREFERRED EMBODIMENT

Figure 1:
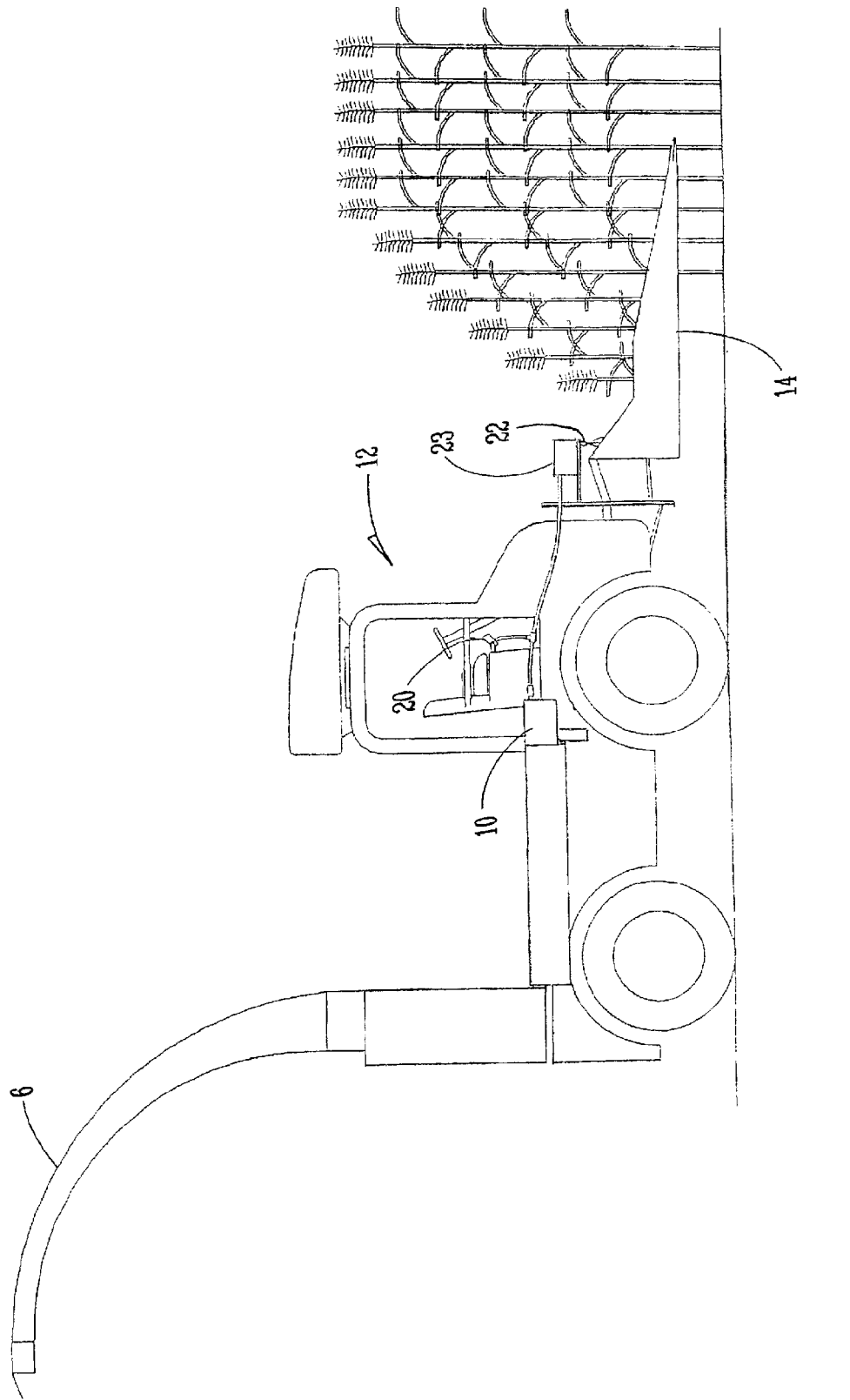
FIG. 1 is a side view of a silage chopper with a preferred embodiment of a forage additive spray apparatus of the present invention mounted thereon.

Turning now to the drawings and with reference first to FIG. 1, a preferred embodiment of a forage additive spray apparatus 10 of the present invention is shown in association with a self-propelled silage chopper 12 including a cutter 14 and discharge chute 16. While FIG. 1 shows the chopper 12, as described herein, it is understood that the present invention can be used with other harvesting and handling equipment such as bailers, combines, roller mills, blowers, etc. Also, the spray apparatus 10 can be used to apply forage additives on various crops, including, but not limited to silage, hay, high moisture corn, and other agricultural crops.

The apparatus 10 is of a relatively small size that is sufficiently small that it can be hand carried conveniently and is, therefore, highly portable and, as indicated by FIG. 1, is mountable on a variety of types of equipment. The apparatus 10 includes a control box/display 20 that preferably is located in the cab of the chopper 12 for convenient operation of the apparatus 10 by the driver of the chopper 12, and also an atomizing spray nozzle 22 for directing an atomized spray of concentrated forage additive on to the silage harvested by the chopper 12. The nozzle 22 is supported by a bracket assembly 23 to overlie the harvested crop as it is fed into the chopper 12.

Figure 2:
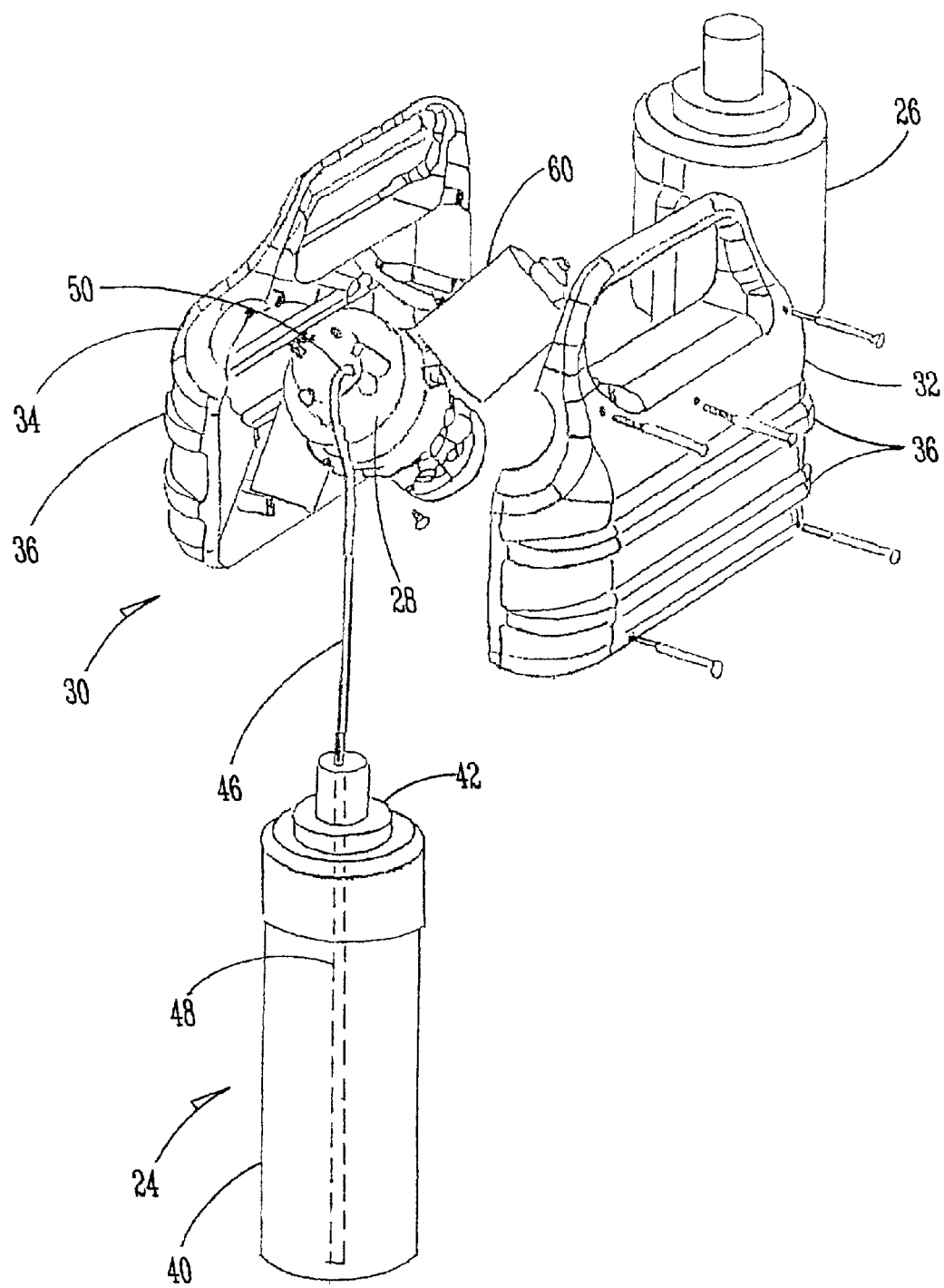
FIG. 2 is a side perspective exploded view of a preferred embodiment of a forage additive spray apparatus of the present invention minus the spray nozzle.

Referring now to FIG. 2, the apparatus 10 further includes a container 24 for storing concentrated forage additives, a container 26 for storing fresh water, a fluid metering pump 28 and a housing 30. Two mirror image shell members 32 and 34 form the housing 30 and it is desirable to make the member 32 and 34 of hardened material such that when they are fastened together they form a rigid housing from which the containers 24 and 26 depend from and the pump 28 is stored therein in a protected position. Preferably the shell member 32 and 34 have laterally extending ribs 36 for strengthening purposes.

The fresh water container 26 has a flushing pump 27 integrated in its lid and is employed for the sole purpose of providing fresh water to flush out the nozzle 22 after a spraying application is completed or interrupted to prevent the nozzle 22 from becoming clogged with the concentrated additive.

Figure 4:
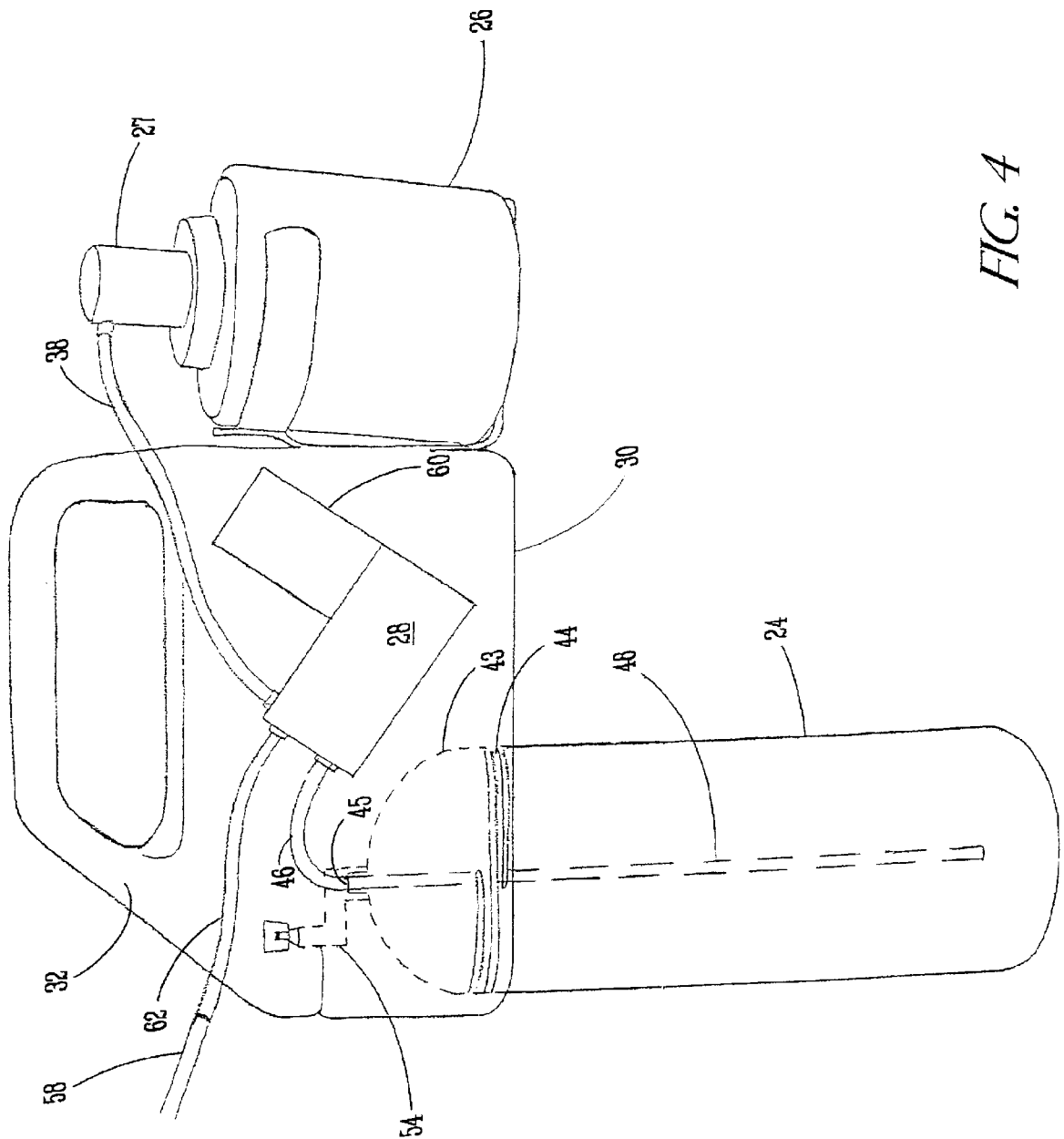
FIG. 4 is a side schematic diagram showing the layout of the components of the apparatus of FIG. 3.

The concentrated additive container 24 is preferably comprised of a blow molded plastic material having a generally cylindrically shaped body portion 40 and an upper outlet portion 42. To secure the additive container 24 in the housing 30, the upper part of the body portion 42 may be sized larger than its bottom portion so that when the shell members 32 and 34 are fit together to form the housing 30 they encircle the top portion 42 of the container 24 to firmly and securely hold the container 24 in position. Alternatively, a domed container acceptor 43, as shown in FIG. 4, may be secured to the housing 30 and have threads 44 that are engagable with threads on the upper part of the body portion 42 to fasten the container 24 to the housing 30. However, it should be obvious to those skilled in the art that other methods of securing the container 24 to the housing 30 may be utilized as the manner of achieving such securement is not a critical feature of the invention.

The container outlet portion 42 has a port 45 that connects to a plastic tubing 46. A pipe 48 that is connected to one end of the tubing 46 extends downwardly into the container. An opposite end of the tubing 46 is in fluid communication with the pump 28. An air vent 54 (shown only in FIG. 4) is also associated with the port 45 to serve as a breather valve to permit air into the container 24 as its contents are pumped out.

In actual usage of the apparatus 10, a user will purchase the container 24 with an appropriate quantity of water soluble forage additive in powder form already therein. Water is then added to the container 24 to convert the additive to a concentrated liquid form through vigorous shaking of the container 24. After the additive is thoroughly mixed with the water, the container 24 is mounted into the housing 30. In view of the limited size of the housing 30, the container 24 is relatively small in size and is adapted to only hold approximately 2500 milliliters of concentrated additive.

The pump 28 is driven by a motor 60 and is preferably a positive displacement measuring pump or other similar type of pump to insure that a desired precise amount of concentrated additive is supplied to the nozzle 22. To provide a means for washing the nozzle 22 after a spraying application is completed or interrupted the pump 27 can be actuated to draw fresh water from the container 26 to flush the nozzle 22 with clean water.

In the preferred embodiment, the pump 28 is a positive displacement measuring pump Model MASIL that is available from MANTS GmbH, but other types of precision controlled fluid pumps may also be employed in the apparatus 10. As indicated by FIG. 4, the pump 28 is connected to the nozzle 22 by means of a plastic tubing 62 so that the concentrated additive can be pumped out of the container 24 and supplied to the nozzle 22 via the pump 28.

Figure 3:
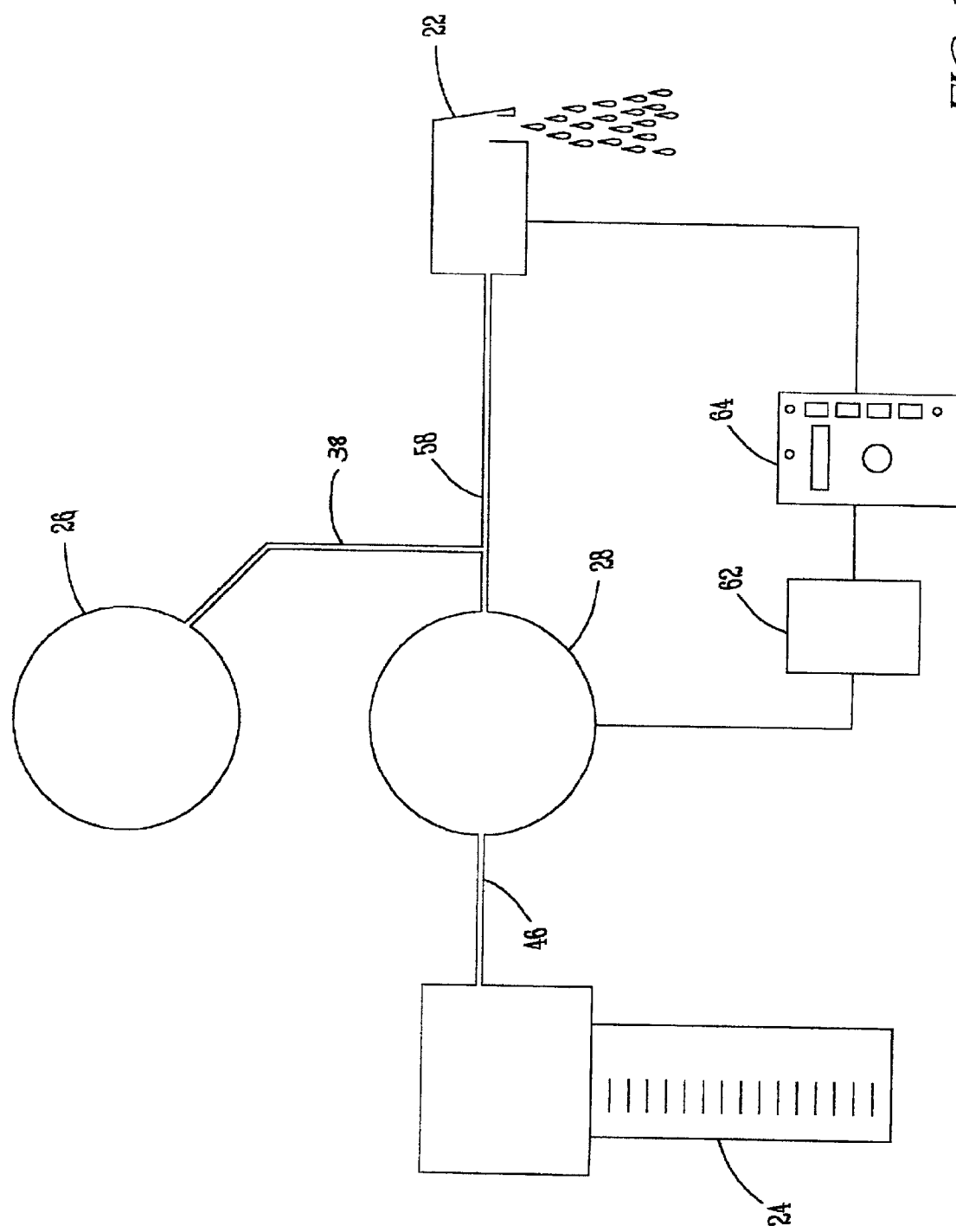
FIG. 3 is a block diagram of the spray apparatus of FIG. 2 minus the atomizing spray nozzle.
Figure 5:
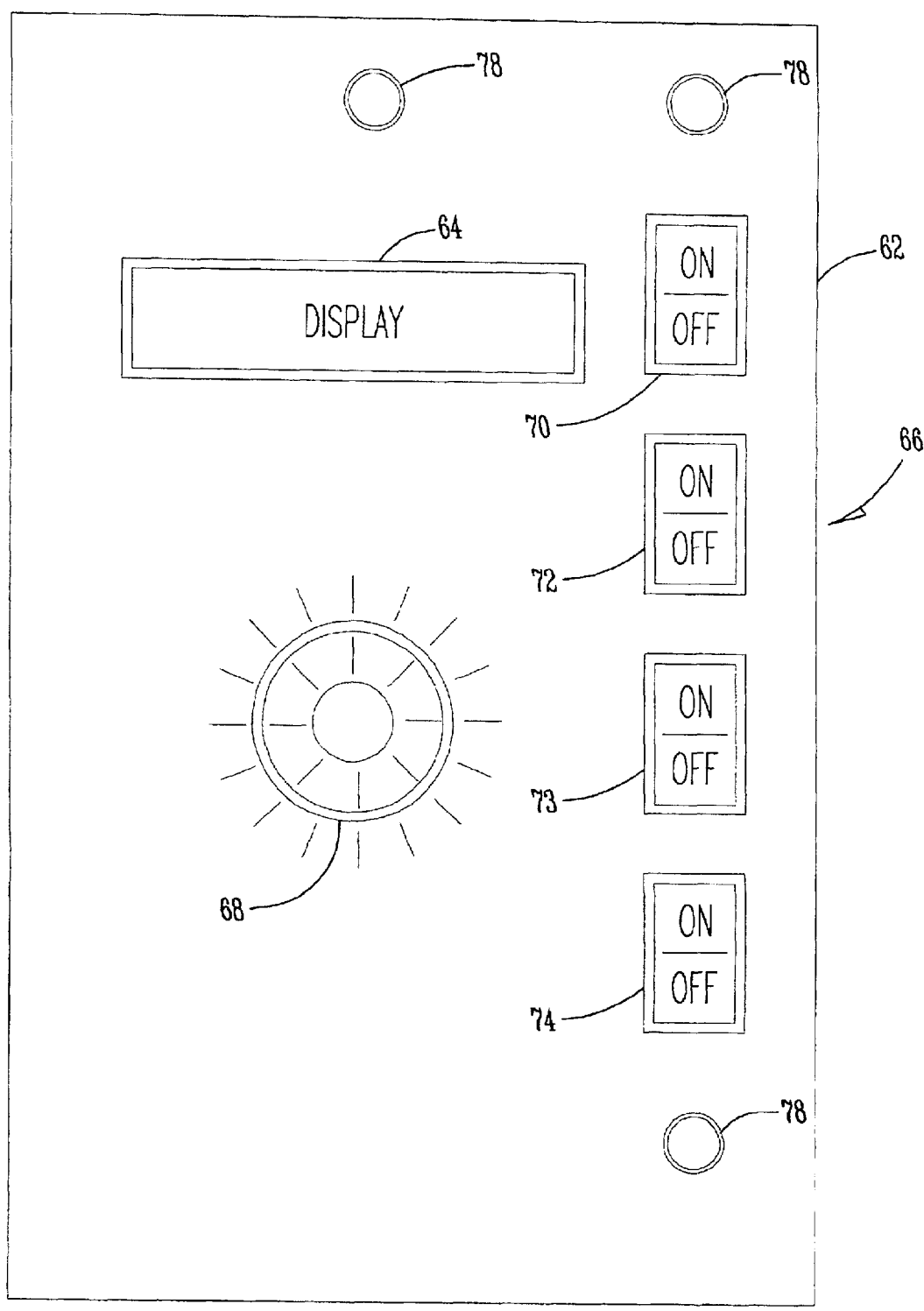
FIG. 5 is a diagram showing a control box/display included as part of the spray apparatus of FIG. 2.

The operation of the motor 60 and the pump 28 is actuated by the control box/display 20, which is preferably formed by a control box 62 and a display 64, as shown in FIG. 3. Although the control box 62 and display 64 may be combined together in a single unit 66 if desired, as shown in the diagram of FIG. 5. Utilizing the unit 66 provides the advantages more efficient operator control and easier mounting of the apparatus 10 on the chopper 12.

Preferably the display 64 is a liquid crystal display and is capable of displaying various information relating to the application of the concentrated additive on the crop such as the application rate of the additive to the crop and the number of tons of forage which have been treated (based on the amount of forage additive that the pump 28 has pumped). The control box 62 includes a variable dosage control dial 68 with preferably a number of on/off switches 70, 72, 74, and 76 and several light emitting diodes 78 which provide indications of the operation of the apparatus 10 such as when the container 24 is low on concentrated additive or the type of information being shown on the display 64, etc. The on/off switch 70 controls the operation of the pump 28 to initiate the flow of concentrated additive from the container 24 to the nozzle 22 via the pipe 48 and the tubing 46 and 58. The switch 72 is adapted to initiate the pump 27 in a flushing operation to provide water from the container 26 to the nozzle 22.

The nozzle 22 is preferably positioned on the chopper 12 to overlay the harvested forage as it enters the chopper 12 and is adapted to provide an atomized spray pattern that is critical to proper operation of the apparatus 10. It has been found that harvested forage can be successfully inoculated with a small quantity of concentrated additive if the additive is supplied in a proper atomized droplet form, with a droplet size approximately forty to fifty microns to provide a spray pattern of approximately thirty million droplets per milliliter of concentrated additive sprayed.

In the preferred embodiment the nozzle 22 is a segment rotary nozzle as disclosed in U.S. Pat. No. 5,788,156, incorporated herein by reference. The atomizer spray nozzle 22 is specifically constructed to provide a precisely defined narrow spray band in comparison to typical spray nozzles with a bandwidth of 1.5 centimeters and a length of thirty to fifty-five centimeters. Through the use of atomizer nozzle 22, the apparatus 10 is adapted to inoculant a ton of forage with the application of preferably eight to twelve milliliters of the concentrated additive. Thus, at such rate, 2500 milliliters of concentrated additive contained in the container 24 are sufficient to treat 210–310 tons of forage without refilling. However, it should be recognized that the application rate can be increased significantly (to 50 milliliters/ton) if desired and still provide a distinct advantage over prior art sprayers in terms of the amount of water that is expended during an application of additive.

When spraying of the harvested forage with the apparatus 10 is completed or is interrupted, it is important for proper operation of the nozzle 22 that it be cleaned of the concentrated additive. To provide such cleaning operation, the switch 72 is actuated to turn the pump 27 on and initiate pumping of fresh water from the container 26 to supply it directly to the nozzle 22 for flushing the additive therefrom via the tube 38. The switch 74 operates the pump 28 in a reverse direction to suck the concentrated additive out of the tube 62 back into the container 24 to clean the system.

Thus, the present invention is designed to provide the application of a concentrated additive to a harvested forage crop in an atomized condition so as to require relatively small amounts of the concentrated additive for proper inoculation of the crop. Although the present invention has been described by means of a preferred embodiment, it is to be understood that the description and terminology used therein is intended to be in the nature of words of description rather than of limitation. Many modifications and variations of the present invention are possible in light of the above teachings. Therefore, within the scope of the appended claims, the present invention may be practiced otherwise as specifically described.

What is claimed is:

1. An apparatus for spraying forage additives on harvested agricultural crops comprising:
   (a) a container of concentrated forage additive formed from a combination of water soluble forage additive and water;
   (b) an additive metering pump in fluid communication with said additive container;
   (c) an atomizing spray nozzle located proximate to said harvested crops and in fluid communication with said pump for spraying said harvested crops with atomized droplets of said additive at a rate in the range of between generally 8–50 milliliters per ton; and
   (d) electrical control means for actuating said pump to provide an adjustable supply of concentrated additive to said spray nozzle as desired during the spraying of said harvested crops with said additive.

2. An apparatus as recited in claim 1, wherein said control means includes a variable control to adjust the application rate of the concentrated additive on said crops and a display means that provides a visual display of the amount of additive being applied or other operational set-up information.

3. An apparatus as recited in claim 2, wherein said atomizing spray nozzle provides a narrow band of atomized droplets having a width of from 1.4 to 1.6 centimeters and a length of 30 to 55 centimeters.

4. An apparatus as recited in claim 2, wherein said atomizing spray nozzle provides a spray of atomized concentrated additive droplets of a size ranging between of 40 to 50 microns.

5. An apparatus as recited in claim 2, wherein said atomizing spray nozzle provides a spray having a pattern formed of approximately 30 million droplets per milliliter of concentrated additive.

6. An apparatus as recited in claim 2 and further including a container of clean water in fluid communication with the atomizing spray nozzle to provide a source of fresh water for rinsing the nozzle when desired.

7. An apparatus as recited in claim 2, wherein said pump is controllable to alternatively supply said concentrated forage additive to the atomizing spray nozzle or suck such additive from said nozzle as desired.

8. An apparatus as recited in claim 7, wherein said concentrated additive is applied to said crop at a rate of 8 to 12 milliliters per ton.

9. An apparatus as recited in claim 7, wherein said container of concentrated additive is of a reduced size and contains no more than ten thousand milliliters of said additive.

10. An apparatus as recited in claim 7, wherein said container of concentrated forage additive is of a reduced size and stores an amount of said additive in the range of from 1000 to 3000 milliliters.

11. An apparatus as recited in claim 2, wherein said concentrated forage additive is applied to said harvested crop at the rate of no greater than 50 milliliters of additive per ton of crop.

12. An apparatus as recited in claim 2, wherein said control means is remotely located with respect to said metering pump.

13. An apparatus as recited in claim 2, wherein said apparatus is of a sufficiently small size that it can be hand carried.

14. A method of treating a harvested agricultural crop with a forage additive comprising the steps of:
   (a) providing a container of concentrated forage additive formed from a combination of water soluble forage additive and water;
   (b) providing an atomizing spray nozzle located proximate to said harvested crop for spraying said crop with atomized droplets of said additive at a rate in the range of between generally 8–50 milliliters per ton;
   (c) providing an additive pump in fluid communication with said additive container and said atomizing spray nozzle; and
   (d) electrically actuating said pump to provide an adjustable supply of concentrated additive from said container to said spray nozzle as desired for the application of atomized droplets of said additive on said crop.

15. A method as recited in claim 14, wherein said atomizing spray nozzle provides a narrow band of atomized droplets having a width of from 1.4 to 1.6 centimeters and a length of 30 to 55 centimeters.

16. A method as recited in claim 15, wherein said concentrated forage additive is applied to said harvested crop at the rate of no greater than 50 milliliters of additive per ton of crop.

17. A method as recited in claim 15, wherein said concentrated additive is applied to said crop at the rate of 8 to 12 milliliters per ton.

18. A method as recited in claim 15, wherein said container of concentrated additive is of a reduced size and contains no more than ten thousand milliliters of said additive.

19. A method as recited in claim 15, wherein said container of concentrated forage additive is of a reduced size and contains an amount of said additive in the range of from one thousand to three thousand milliliters.

20. A method as recited in claim 15, and further including the step of providing a container of clean water in fluid communication with the atomizing spray nozzle to provide a source of fresh water for rinsing the nozzle when desired.

* * * * *

UNITED STATES PATENT AND TRADEMARK OFFICE
CERTIFICATE OF CORRECTION

PATENT NO. : 6,848,627 B2
DATED : February 1, 2005
INVENTOR(S) : James M. Oepping et al.

It is certified that error appears in the above-identified patent and that said Letters Patent is hereby corrected as shown below:

Column 5,
Line 20, should read -- (b) an additive pump in fluid communication --.

Signed and Sealed this

Third Day of May, 2005

JON W. DUDAS
*Director of the United States Patent and Trademark Office*